United States Patent [19]

Makabe et al.

[11] Patent Number: 4,610,211
[45] Date of Patent: Sep. 9, 1986

[54] ELECTRONIC CONTROL SEWING MACHINE

[75] Inventors: Hachiro Makabe, Kanagawa; Haruhiko Tanaka, Tokyo; Takeshi Kongoh, Koganei, all of Japan

[73] Assignee: Janome Sewing Machine Co., Ltd., Tokyo, Japan

[21] Appl. No.: 614,723

[22] Filed: May 25, 1984

[30] Foreign Application Priority Data

Jun. 6, 1983 [JP] Japan .................................. 58-99309

[51] Int. Cl.⁴ ............................................. D05B 3/02
[52] U.S. Cl. ..................................... 112/445; 112/454
[58] Field of Search .......... 112/158 E, 158 F, 121.11, 112/121.12, 445, 453, 454, 457, 458

[56] References Cited

U.S. PATENT DOCUMENTS

| 4,341,170 | 7/1982 | Beckerman et al. | 112/158 E |
| 4,413,574 | 11/1983 | Hirota et al. | 112/158 E X |
| 4,499,836 | 2/1985 | Meier et al. | 112/158 E |
| 4,502,402 | 3/1985 | Kato | 112/158 F X |

Primary Examiner—Peter Nerbun
Attorney, Agent, or Firm—Michael J. Striker

[57] ABSTRACT

An electronic sewing machine is disclosed in which a first memory stores a plurality of patterns, a second memory temporarily memorizes pattern numbers each specific to the patterns, a first switch and address pointing means enable the second memory to memorize a series of selected pattern numbers, and a second switch resets the address pointing means. The address pointing means also advances the address of the second memory such that a display indicates the pattern numbers one after the other in the desired order.

2 Claims, 3 Drawing Figures

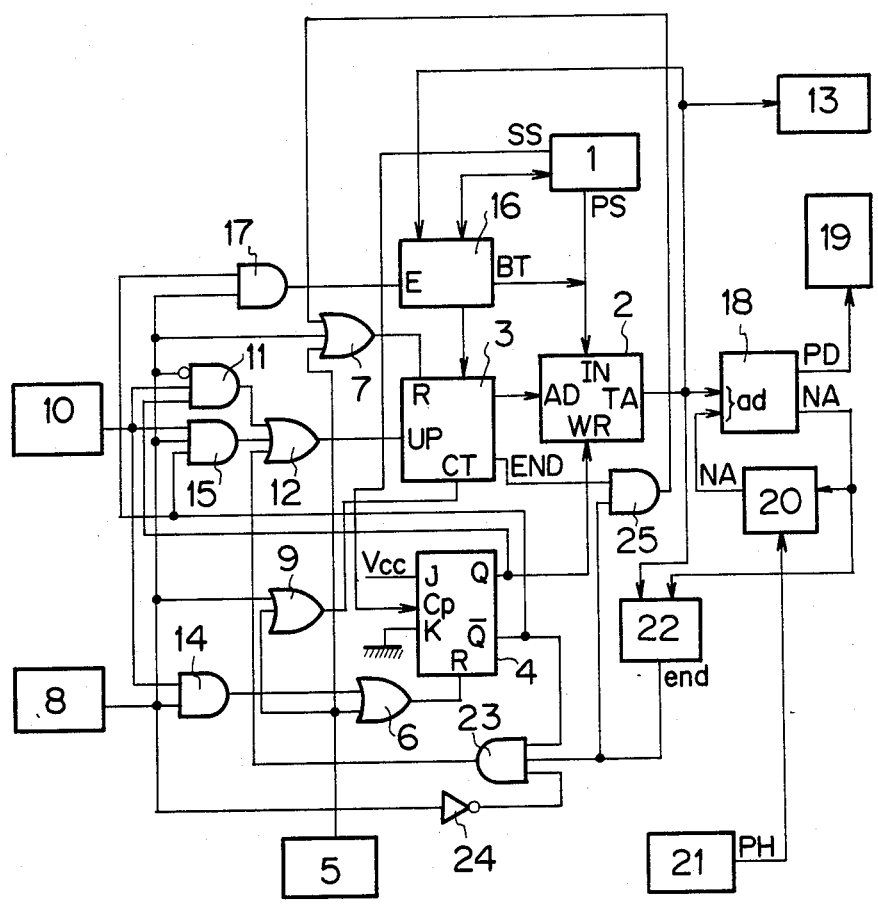
FIG_1

FIG_2

| | Absence of UP Input | Presence of UP Input | | | |
|---|---|---|---|---|---|
| | Write-down data | Write-down data | | Memorizing data | |
| PS | ADn | TAn | ADn+1 | TAn+1 | ADn | TAn |
| A | 1 | A | 2 | A | 1 | A |
| B | 2 | B | 3 | B | 2 | B |
| C | 3 | C | 4 | C | 3 | C |
| D | 4 | D | 5 | D | 4 | D |
| E | 5 | E | 6 | E | 5 | E |

FIG_3

| | Memorizing data | | | |
|---|---|---|---|---|
| | Before transmission | | After transmission | |
| PS | ADn | TAn | ADn+1 | TAn |
| | 1 | A | | |
| | 2 | B | | |
| X | 3 | C | 3 | X |
| | 4 | D | 4 | C |
| | 5 | E | 5 | D |
| | | | 6 | E |

ELECTRONIC CONTROL SEWING MACHINE

BACKGROUND OF THE INVENTION

Field of the Invention

This invention relates to selection and indication of patterns to be stitched of an electronic control sewing machine which forms stitched patterns in accordance with signals of an electronic memory.

Electronic control sewing machines select a plurality of patterns and store them, and automatically form them in succession. The stored patterns and their storing order could be confirmed only after they have been stitched. Therefore, especially if a lot of patterns were memorized, the confirmation would be difficult.

SUMMARY OF THE INVENTION

An object of the present invention is to provide such a sewing machine, wherein, for confirming the memorized patterns and their memorized order, a corresponding key is operated, and then a mark with a number or the like indicative of the desired pattern is indicated per each time of operating the key, and, on the other hand, this operation is incorporated with the operation of another key in order to add and store new patterns at positions of designated orders in relation with the position of said indicated pattern, and those patterns are replaced by other patterns.

BRIEF DESCRIPTION OF THE DRAWINGS

FIG. 1 is a control block diagram showing an embodiment of the invention;

FIG. 2 shows advance of address designating value; and

FIG. 3 shows a signal PS of a pattern selecting device.

DETAILED DESCRIPTION OF THE PREFERRED EMBODIMENT

The invention will be explained with reference to an embodiment shown in the accompanying drawings. The numeral 1 is a pattern selecting device, and its operating part is provided at a head of the sewing machine. This device 1 gives a pattern number signal PS proper to a selected pattern to a terminal (IN) of a pattern number memory 2. If the memory 2 receives at this time a write-down ordering signal of H level at a terminal (WR), it stores the signal PS at an address position designated by an address pointer 3.

A flip-flop 4 receives electric potential Vcc of H level and grounded electric potential at terminals (J) and (K). When the pattern selecting device 1 is operated, the flip-flop 4 receives an operation signal SS at a terminal (Cp) and is set, and it sends a signal of H level from a terminal (Q) to a terminal (WR) of the pattern number memory 2. When a controller 5 for a machine motor is started, the flip-flop 4 receives a reset signal at a terminal (R) via OR circuit 6 and is reset.

An address pointer 3 receives a reset signal at a terminal (R) via OR circuit 7 at its initial setting or when the controller 5 is operated and it is reset, and advances an address designation to a terminal (AD) of the pattern number memory 2 each time of receiving a rising signal of a terminal (UP). When a read-out key 8 is operated at a side of designating the read-out, or when the controller 5 is operated at the beginning of stitching, the address pointer 3 receives operating signals at a terminal (CT), and it memorizes the last address designating value at that time and is reset via OR circuit 7.

A memory key 10 is provided at the head of the sewing machine to serve as a first using object that the key 8 is operated subsequently to the operation of the pattern selection device 1, and it makes the pattern number memory 2 store the pattern number signal of the pattern having been selected at said operation, and repeats the above mentioned operations for storing a plurality of patterns. If the memory key 10 is operated, under conditions that the read-out key 8 does not designate reading-out but is normally used, and the output therefrom is L level and the flip-flop 4 is set as said above, the address pointer 3 receives an operation signal at a terminal (UP) via AND circuit 11 and OR circuit 12, and advances the address designating value AD per each of the operations.

Referring to FIG. 2, for example, if the pattern selection device 1 and the memory key 10 are not both operated, and therefore the address pointer 3 does not receive an input signal at the terminal (UP), and it the pattern A is initially selected, an address designating value $AD_n$ by the address pointer 3 is 1. If the data $TA_n$ written in said address of the pattern number memory 2 is A and the memory key 10 is operated and UP input s present, the advancing address designating value $AD_n+1$ becomes 2, and the data $TA_n+1$ to be written down in this address is A. Then, the data A of the data $TA_n$ is memorized where the address $AD_n$ before advancing is written down at the memory position of 1, and subsequently the data A of the address 2 is changed to the data B just after the pattern B is selected (absence of UP input), and when the memory key 10 is operated (presence of UP input), the data B of the address 2 is memorized, and the address designating value is advanced. At writing down and memorizing the data, the pattern number memory 2 outputs, as an output signal TA, the write-down data $TA_n$ or $TA_n+1$ which are address-designated, and the memory 2 outputs the memory data $TA_n$ which are address-designated at reading out the data.

An indicator of an indicating device 13 is provided at the head of the sewing machine. When the pattern number memory 2 outputs the memory data TA of the address designated by the address pointer 3 (the memory address in the present embodiment is an initial address of the stitch control signal), the indicating device 13 indicates the pattern number of the pattern.

The read-out key 8 is provided at the head of the sewing machine for switching each function of the memory key 10 and indicating it. The read-out key 8 has two operating positions, and when it is operated at the side of reading-out designation, it is H level, and then it reads out in succession and confirms the patterns by operation of the memory key 10. Further, the operation of the pattern selecting device is incorporated, and a new pattern is added at a position in order of a pattern appropriately positioned in the stored patterns, and the read-out key 8 makes designation to change the added patterns. When the read-out key 8 is operated to the side of designating the read-out, the address pointer 3 is reset as mentioned above, and the memory key 10 subsequently resets the flip-flop 4 via AND circuit 14 and OR circuit 6 by said operation to advance the address pointer 3 via AND circuit 15 and OR circuit 12 per each of the operations at that time and subsequently. Therefore, the address of the pattern memory 2 advances successively to serve as a second object to indicate the numbers of the stored patterns on the indicating device 13 in successions.

A block transmission circuit 16 is operated for a determined period of time when the read-out key 8 is operated to the side of reading-out and the circuit 16 receives the signal of H level at an output control terminal (E) while the flip-flop 4 is reset, and also after it is L level.

Referring to FIG. 3, when number data TAn of the pattern is stored at the address ADn of the pattern number memory 2, and the memory key 10 is operated to read out the number data TAn of a desired pattern so that the pattern number is shown in the indicating device 13, and if a new pattern is then selected by operation of the pattern selecting device 1, each of said operations serves as a third using object for the addition of the new pattern to the stored patterns. That is, the block transmission circuit 16 carries out storing temporarily the number data, nullifying a signal PS after this signal (a pattern X in FIG. 3) of the pattern selecting device 1 has been replaced in the memory by said read-out address position, making the block transmission signal BT effective, advancing by 1 the address pointer 3, transmitting said temporally stored data TAn, storing it in the advanced address position ADn+1, performing this memory-replace until the number data of the last pattern of the stored patterns, and recovering to the value before the transmission the address designation without the transmission of the number data. As a result, since the address of the number data of the transmitted pattern is carried out by the amount of new added pattern rather than the address before transmission, the value of designating the last address is replaced in the memory by making plus 1.

When a pattern data memory 18 receives an initial address TA at an address terminal (ad) from the pattern number memory 2, it transmits to a pattern forming device 19 a stitch control signal PD per each of the stitches. The pattern data memory 18 stores a next address signal NA in a couple with the stitch control signal PD, and a timing buffer 20 receives a synchronizing signal PH per each of the stitches from an upper shaft synchronizing signal generator 21, and issues the signal NA at the address terminal (ad) of the memory 18 to change an address. The next address NA making the couple with the last stitch control signal PD is an initial address TA for repeating the pattern, and a cycle detecting device 22 compares and determines the initial address TA and at this time outputs a finishing signal (end) with respect to the unit pattern.

AND circuit 23 receives an inverted output $\overline{Q}$ of the flip-flop 4 and a signal of the read-out key 8 via an inverter 24, and it is effective to the finishing signal (end) when the read-out key 8 designates the ordinary using side, and it advances the address pointer 3 via OR circuit 12 every time the unit pattern finishes.

The address pointer 3 outputs the last signal END when it is at the value of designating the last address. When AND circuit 25 receives the signal END and the finishing signal (end), the address pointer 3 is reset via OR circuit 7 in order to repeat the stored patterns.

With respect to the above mentioned structure, when the read-out key 8 is operated to the ordinary using side and its output is L level, the pattern selecting device 1 is operated, otherwise when the pattern A is selected as the initial pattern as seen in FIG. 2, the flip-flop 4 is set, and the pattern number memory 2 enables to store patterns selected thereafter.

When the memory key 10 is operated, the address designating value ADn+1 of the address pointer 3 is 2 and the data A is stored as the number signal TAn written down in the address designating value ADn, i.e., the address 1. When the pattern B is selected and the memory key 10 is operated, the data B is stored in the address 2, and similarly the patterns C, D, E are stored in the addresses 3, 4, 5 successively each time the memory key 10 is operated.

When the controller 5 is operated to start stitching, the address pointer 3 and the flip-flop 4 store at the beginning the last address designating value 5 and are reset concurrently.

The synchronizing signal PH is generated each time the sewing machine is driven and the initial pattern A is formed. When the finishing signal (end) is issued at the finishing of forming the pattern A, the address pointer 3 advances to the pattern B, and to the patterns C, D, and when it comes to the pattern E, the last signal END is issued. When the finishing signal (end) is issued at the finishing of the pattern E, the address pointer 3 is reset, and the patterns A to E are formed continuously.

When these patterns are stored and the read-out key 8 is operated to the side of designating the reading-out before or after the operation of the controller 5, for example, before the controller 5 is operated, the address pointer 3 stores the last address designating value 5 and is reset. The indicating device 13 shows the pattern A. When the memory key 10 is operated, the flip-flop 4 is reset, and then the address pointer 3 advances and the device 13 shows the pattern B. The patterns C to E are successively shown each time when the memory key 10 is operated. These patterns are repeatedly shown and confirmed by re-operating the read-out key 8.

In the course of these operations, the block transmission circuit 16 makes the block transmission effective. If a pattern X is selected as shown in FIG. 3, by operating the pattern selecting device 1 when the pattern C is designated, the flip-flop 4 is set. The function of the block transmission circuit 16 is maintained though the output control terminal E is L level. At this time, the address ADn of the pattern number memory is 3, and the number data TAn of the pattern C stored in said memory is stored temporarily in the block transmission circuit 16, when the number data of the pattern X is stored in the address. The pattern selection signal PS is nullified and the transmission signal BT is made effective. The address pointer 3 advances, and the address designation value ADn+1 is 4, and the number data TAn of the pattern C stored previously is stored in said address. When the number data of the pattern E is stored in the address at last, the transmission is finished, and the last address designation value is replaced from 5 to 6, and the value of the address pointer 3 is 3 as the initial value. When the pattern selection device 1 is operated to select a new pattern, the pattern C of the address pointer 3 is changed to a new pattern. When the memory key 10 is operated, the flip-flop 4 is reset, and the memorization is finished. When the read-out key 8 is operated at the ordinary using side to operate the controller 5, the address pointer 3 is reset, and the stitching starts from the initial pattern of the stored patterns and is repeated.

As having mentioned above, according to the invention, it is possible to confirm the stored patterns and the memorizing order, and add new patterns at optional positions of the stored patterns, or change the stored pattern to new ones.

We claim:

1. An electronic sewing machine having a first memory storing a plurality of patterns in the form of stitch control data which may be sequentially read out to control stitch forming instruments of the sewing machine to form stitch patterns on a fabric, pattern selecting means including a plurality of pattern selecting switches selectively operated to produce pattern signals representing the pattern numbers each specific to the patterns stored in the first memory, a second memory having second address means for temporarily memorizing the pattern numbers produced from the pattern selecting switches, a first switch means operated to enable the second memory to memorize a series of selected pattern numbers in a desired order, a display operated each time the second memory memorizes a pattern number to display the same in place of the precededly displayed one, an improvement comprising address pointing means responsive to each operation of said first switch means to advance the addresses of said second address means progressively from the initial to the last to thereby enable said second memory to memorize the series of selected pattern numbers in a desired order, and a second switch means operated to produce a signal to reset said address pointing means to the initial address of said second memory after the latter has memorized said series of selected pattern numbers and simultaneously to enable said first switch in each operation to cause said address pointing means to progressively advance the address of said second memory such that said display is operated to indicate said pattern numbers stored in said second memory one after another in the predetermined order.

2. An electronic sewing machine as defined in claim 1; and further comprising data transmission means being operable upon operation of said second switch, said data transmission means being operated in response to operation of said pattern selecting means to temporarily memorize the pattern number located in the address of the second memory which was then pointed by said address pointing means, to thereby allow said second memory to memorize the pattern number selected by said operation of said pattern selecting means in said address pointed by said address pointing means, said data transmission means producing a signal to operate said address pointing means to advance the addresses of said second memory one by one such that the pattern number temporarily memorized by said data transmission means and the subsequent pattern numbers are shifted to the subsequent address of said second memory respectively.

* * * * *